(12) United States Patent
Wu et al.

(10) Patent No.: US 9,674,299 B2
(45) Date of Patent: Jun. 6, 2017

(54) STANDBY AGENT APPARATUS FOR KEEPING ACCOUNT OF CLIENT SYSTEM ON-LINE IN APPLICATION SERVER WHEN CLIENT SYSTEM IS OPERATING IN STANDBY MODE AND RELATED CONNECTION HANDLING METHOD THEREOF

(75) Inventors: Hua Wu, Hsinchu County (TW); Tzu-Shiun Liu, Hsinchu County (TW); Ching-Chieh Wang, Yilan County (TW); Jung-Chih Liu, New Taipei (TW)

(73) Assignee: MEDIATEK INC., Hsin-chu (TW)

( * ) Notice: Subject to any disclaimer, the term of this patent is extended or adjusted under 35 U.S.C. 154(b) by 915 days.

(21) Appl. No.: 13/481,873

(22) Filed: May 28, 2012

(65) Prior Publication Data

US 2013/0318230 A1 Nov. 28, 2013

(51) Int. Cl.
*G06F 15/173* (2006.01)
*H04L 29/08* (2006.01)
*H04N 21/443* (2011.01)
*H04N 21/4788* (2011.01)

(52) U.S. Cl.
CPC .......... *H04L 67/2861* (2013.01); *H04L 67/14* (2013.01); *H04N 21/4436* (2013.01); *H04N 21/4788* (2013.01)

(58) Field of Classification Search
CPC ....... H04L 43/08; H04L 43/10; H04L 43/065; H04L 67/145; H04L 29/08612; H04L 67/14; H04L 67/2861; H04L 43/0811; H04N 21/4436; H04N 21/4788; H04N 1/00896

USPC .......... 709/224, 202, 203, 227, 228
See application file for complete search history.

(56) References Cited

U.S. PATENT DOCUMENTS

| | | | |
|---|---|---|---|
| 8,561,118 B2 * | 10/2013 | Flynn-Ripley et al. ...... | 725/109 |
| 8,831,666 B2 * | 9/2014 | Cherukuri ............. | G06F 1/3287 370/318 |
| 2010/0013551 A1 * | 1/2010 | Reams ......................... | 327/544 |
| 2010/0064328 A1 * | 3/2010 | Laasik et al. ................ | 725/106 |
| 2010/0330927 A1 * | 12/2010 | Cherukuri ............. | G06F 1/3287 455/68 |
| 2011/0173672 A1 * | 7/2011 | Angiolillo et al. ........... | 725/118 |
| 2015/0074440 A1 * | 3/2015 | Cherukuri ............. | G06F 1/3287 713/324 |

\* cited by examiner

*Primary Examiner* — Kenneth R Coulter
(74) *Attorney, Agent, or Firm* — Oblon, McClelland, Maier & Neustadt, L.L.P.

(57) ABSTRACT

A standby agent apparatus includes an interface and a standby agent controller. The interface is arranged for receiving at least first account information of a first system. The standby agent controller is coupled to the interface. When the first system is operating in a standby mode, the standby agent controller is arranged for keeping an account of the first system on-line in a first application server according to the received first account information of the first system. A connection handling method includes the following steps: receiving first account information of a first system; and when the first system is operating in a standby mode, keeping an account of the first system on-line in a first application server according to the received first account information of the first system.

20 Claims, 9 Drawing Sheets

STANDBY AGENT APPARATUS FOR KEEPING ACCOUNT OF CLIENT SYSTEM ON-LINE IN APPLICATION SERVER WHEN CLIENT SYSTEM IS OPERATING IN STANDBY MODE AND RELATED CONNECTION HANDLING METHOD THEREOF

BACKGROUND

The disclosed embodiments of the present invention relate to dealing with a connection between two electronic devices, and more particularly, to a standby agent apparatus for keeping an account of a client system on-line in an application server when the client system is operating in a standby mode and related connection handling method thereof.

With development of the technology, a television is able to support more functions. For example, the television may support a network function, thus enabling the user to more conveniently access Internet multimedia contents. As the television is equipped with the network connectivity capability, many network-based applications may be executed on the television to make the user have improved experience of using the television. For example, a first user of a first television may exchange information with a second user of a second television by means of Internet and appropriate application software executed on respective first and second televisions. However, when one of the first and second televisions is powered off to enter a standby mode, the network connection between the first and second televisions is no longer available. For example, the first user may be allowed to have contact with the second user via a centralized application server. When both of the first television and the second television are operating in a normal mode, the application software executed on the first and second televisions would log in the centralized application server via the Internet. Thus, accounts of the first and second users become on-line in the centralized application server, which allows the first user and the second user to exchange information with each other through the application software executed on the first and second televisions. However, when the second user powers off the second television due to certain reasons, the second television is disconnected from the centralized application server, and the account of the second user of the second television becomes off-line in the centralized application server. As a result, the on-line first user fails to have contact with the off-line second user using the application software executed on the first television. To have contact with the second user again, the first user has to manually make a phone call to the second user and ask the second user to power on the second television, which is time-consuming and inconvenient.

SUMMARY

In accordance with exemplary embodiments of the present invention, a standby agent apparatus for keeping an account of a client system on-line in an application server when the client system is operating in a standby mode and related connection handling method thereof are proposed to solve the above-mentioned problems.

According to a first aspect of the present invention, an exemplary standby agent apparatus is disclosed. The exemplary standby agent apparatus comprises an interface and a standby agent controller. The interface is arranged for receiving at least first account information of a first system. The standby agent controller is coupled to the interface. When the first system is operating in a standby mode, the standby agent controller is arranged for keeping an account of the first system on-line in a first application server according to the received first account information of the first system.

According to a second aspect of the present invention, an exemplary connection handling method is disclosed. The exemplary connection handling method comprises the following steps: receiving first account information of a first system; and when the first system is operating in a standby mode, keeping an account of the first system on-line in a first application server according to the received first account information of the first system.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
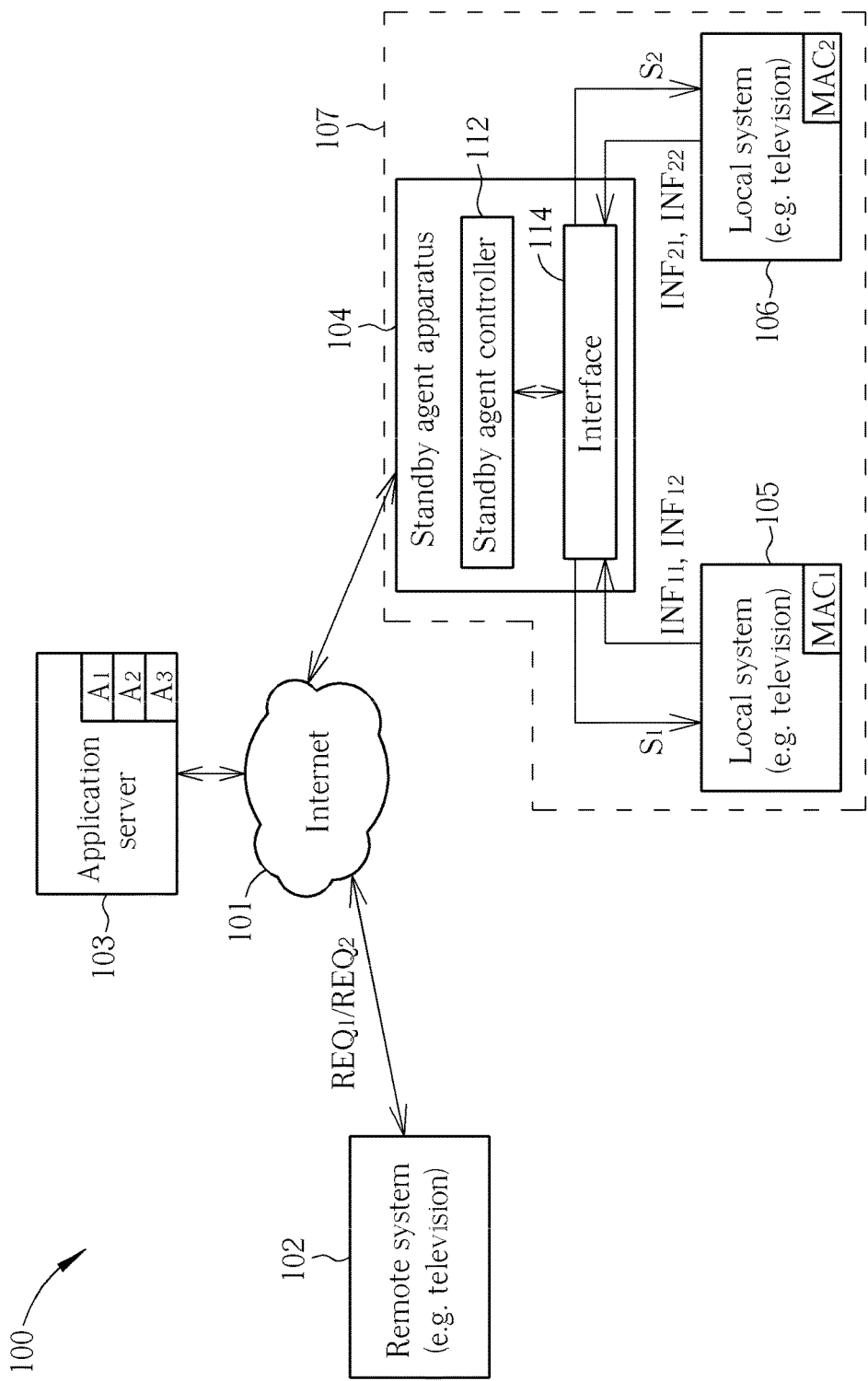
FIG. 1 is a diagram illustrating a first system architecture according to an exemplary embodiment of the present invention.

FIG. 1 is a diagram illustrating a first system architecture according to an exemplary embodiment of the present invention. By way of example, but not limitation, the first system architecture 100 may be used for real-time communications. A remote system (e.g., a television) 102 is coupled to an application server 103 via Internet 101. In this exemplary embodiment, the application server 103 is arranged for managing a real-time communication service, such as Skype, MSN, QQ, or Google Talk. The standby agent apparatus 104 is disposed outside of a plurality of local systems (e.g., televisions) 105 and 106, and coupled to the application server 103 via Internet 101. The remote system 102 and the local systems 105, 106 act as client systems coupled to the application server 103. It should be noted that there is no limitation on the number of local systems coupled to the standby agent apparatus 104. The standby agent apparatus 104 may be disposed in a network apparatus whose power is always on. For example, the network apparatus may be a hub, a switch or a DSL modem allocated at user's home, and the standby agent apparatus 104 and the local systems 105, 106 are therefore disposed in a local area network (LAN) 107, where the local systems 105 and 106 have media access control (MAC) addresses $MAC_1$ and $MAC_2$, respectively.

Regarding the standby agent apparatus 104, it includes a standby agent controller 112 and an interface 114. In this exemplary embodiment, the interface 114 is a network interface coupled to the local systems 105 and 106. In a case where the local system 105 is about to enter a standby mode during a power-down session, the local system 105 may transmit account information $INF_{11}$ and identification information $INF_{12}$ (e.g., a MAC address $MAC_1$) of the local system 105 to the standby agent apparatus 104. In other words, the interface 114 is used for receiving the account information $INF_{11}$ and the identification information $INF_{12}$ of the local system 105. Similarly, in a case where the local system 106 is about to enter a standby mode during a power-down session, the local system 106 transmits account information $INF_{21}$ and identification information $INF_{22}$ (e.g., a MAC address $MAC_2$) of the local system 106 to the standby agent apparatus 104. Therefore, the interface 114 is also used for receiving the account information $INF_{21}$ and the identification information $INF_{22}$ of the local system 106.

The standby agent controller 112 is coupled to the interface 114, and is capable of accessing the received account information $INF_{11}/INF_{21}$ and identification information $INF_{12}/INF_{22}$ through the interface 114. When the local system 105 is operating in the standby mode (i.e., the local system 105 is powered off), the standby agent controller 112 is operative to keep an account $A_1$ of the local system 105 on-line in the application server 103 according to the received account information $INF_{11}$. For example, the account information $INF_{11}$ may include an account name and a password needed to log in the application server 103. Hence, even though the local system 105 is powered off and disconnected from the application server 103, the account $A_1$ of the local system 105 remains on-line in the application server 103 with the help of the standby agent controller 112 implemented in the standby gent apparatus 104.

Similarly, when the local system 106 is operating in the standby mode (i.e., the local system 106 is powered off), the standby agent controller 112 is operative to keep an account $A_2$ of the local system 106 on-line in the application server 103 according to the received account information $INF_{21}$, where the account information $INF_{21}$ may include an account name and a password needed to log in the application server 103. Hence, even though the local system 106 is powered off and disconnected from the application server 103, the account $A_2$ of the local system 106 remains on-line in the application server 103.

Figure 2:
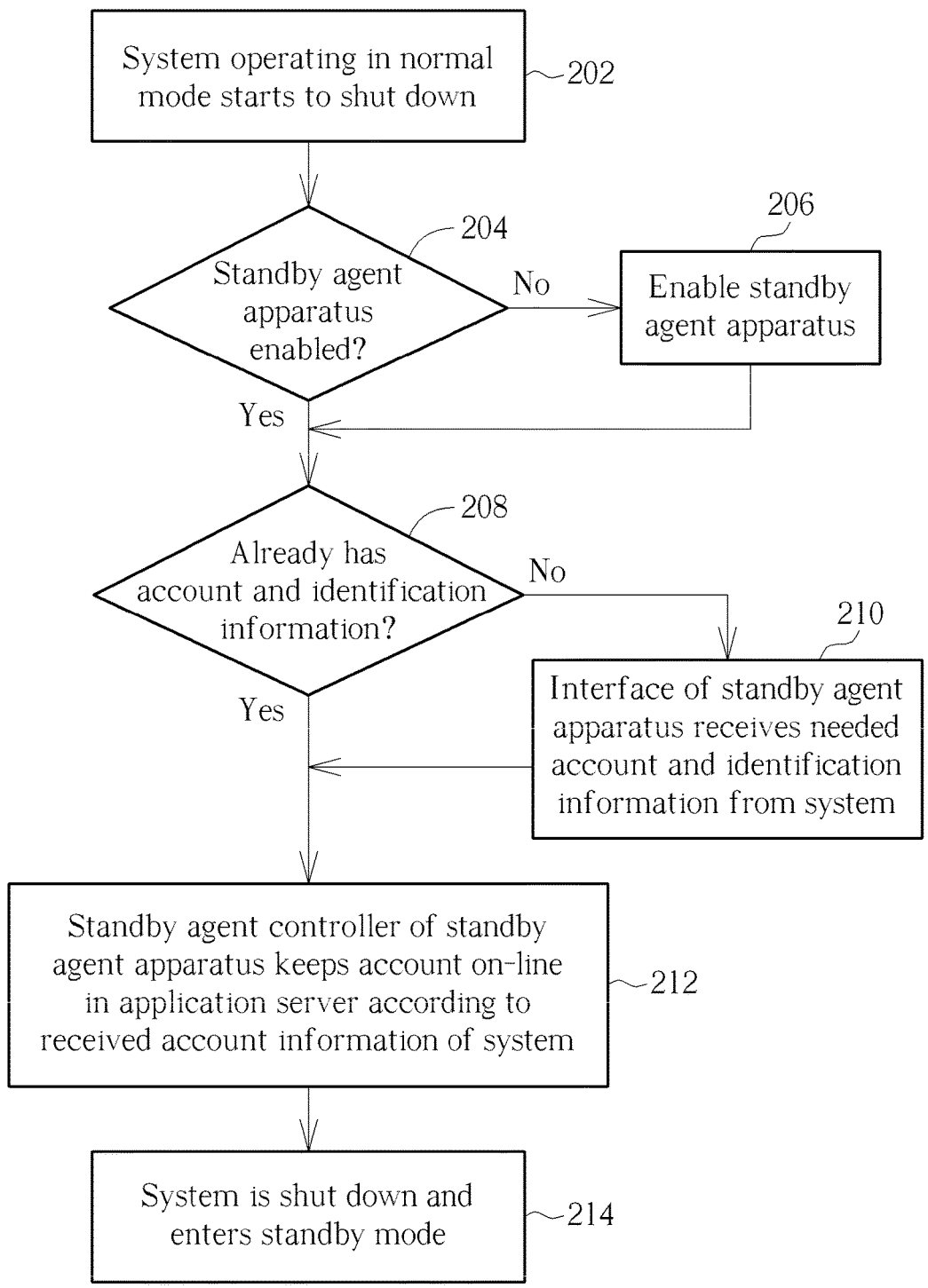
FIG. 2 is a flowchart illustrating a system power-down procedure according to an exemplary embodiment of the present invention.

FIG. 2 is a flowchart illustrating a system power-down procedure according to an exemplary embodiment of the present invention. It should be noted that if the result is substantially the same, the steps are not required to be executed in the exact order shown in FIG. 2. The system power-down procedure may be briefly summarized as below.

Step 202: A system operating in a normal mode starts to shut down.

Step 204: Check if a standby agent apparatus is enabled? If yes, go to step 208; otherwise, go to step 206.

Step 206: Enable the standby agent apparatus.

Step 208: Does the standby agent apparatus already have the corresponding account information and identification information of the system? If yes, go to step 212; otherwise, go to step 210.

Step 210: An interface of the standby agent apparatus receives the needed account information and identification information from the system.

Step 212: A standby agent controller of the standby agent apparatus keeps an account of the system on-line in an application server according to the received account information of the system.

Step 214: The system is shut down and enters a standby mode.

It should be noted that steps 204 and 206 are used for error handling and may be optional. Preferably, the standby agent apparatus 104 is always powered on regardless of the actual operational status of the local system 105. Hence, the steps 204 and 206 are allowed to be omitted. As a person skilled in the art should readily understand details of each step after reading above paragraphs, further description is omitted here for brevity.

As a connection handling method, including steps 208-212, is performed during a power-down procedure of a system (e.g., the local system 105/106), an account of the system would remain on-line in the application server 103 after the system is powered off. Hence, the user of the remote system 102, which has an on-line account $A_3$ in the application server 103, would find the account of the shut-down system is on-line, and is allowed to make contact with the user of the shut-down system through the real-time communication software executed on the remote system 102. For example, the remote system 102 may send a request $REQ_1$ to the local system 105 to ask for real-time communications. When the standby agent controller 112 receives the request $REQ_1$ under a condition where the local system 105 is operating in the standby mode, the standby agent controller 112 is operative to wake up the local system 105. Specifically, as the local system 105 is disposed in the LAN 107 and the identification information (e.g., the MAC address $MAC_1$) is sent to the standby agent apparatus 104 beforehand, the standby agent controller 112 may send a wake-up signal (wake-up packet) $S_1$ to the MAC address $MAC_1$ for waking up the local system 105. After the local system 105 leaves the standby mode and enters the normal mode, the standby agent controller 112 forwards the received request $REQ_1$ to the local system 105, and then the local system 105 deals with the request $REQ_1$ for enabling real-time communications between users of the remote system 102 and the local system 105.

Similarly, the remote system 102 may send a request $REQ_2$ to the local system 106 to ask for real-time communications. When the standby agent controller 112 receives the request REQ$_2$ under a condition where the local system 106 is operating in the standby mode, the standby agent controller 112 is operative to wake up the local system 106, for example, by sending a wake-up signal (wake-up packet) S$_2$ to the MAC address MAC$_2$. After the local system 106 leaves the standby mode and enters the normal mode, the standby agent controller 112 forwards the received request REQ$_2$ to the local system 106, and then the local system 106 deals with the request REQ$_1$ for enabling real-time communication between users of the remote system 102 and the local system 106.

Preferably, only when a system enters a standby mode, the standby agent controller 112 is operative to keep an account of a system on-line in the application server 103. To put it another way, the standby agent controller 112 is not responsible for keeping the account A$_1$ on-line in the application server 103 when the local system 105 is operating in the normal mode, and is not responsible for keeping the account A$_2$ on-line in the application server 103 when the local system 106 is operating in the normal mode. Hence, the local system 105/106 with more powerful computing capability would take over the task of keeping a corresponding account on-line in the application server 103 after leaving the standby mode.

Figure 3:
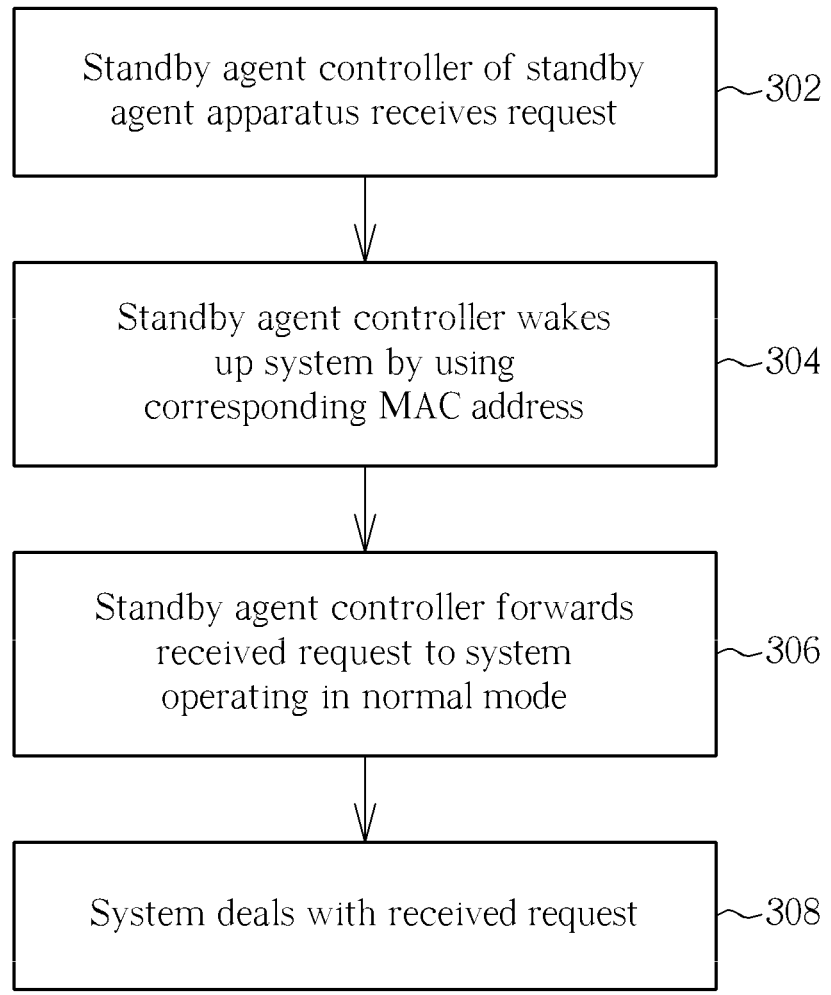
FIG. 3 is a flowchart illustrating a system power-on procedure according to an exemplary embodiment of the present invention.

FIG. 3 is a flowchart illustrating a system power-on procedure according to an exemplary embodiment of the present invention. It should be noted that if the result is substantially the same, the steps are not required to be executed in the exact order shown in FIG. 3. The system power-on procedure may be briefly summarized as below.

Step 302: A standby agent controller of a standby agent apparatus receives a request. For example, the request may be generated from a remote system to ask for real-time communications.

Step 304: The standby agent controller wakes up a system by using a corresponding MAC address. In response to a wake-up signal (wake-up packet) sent to the corresponding MAC address, the system leaves a standby mode and enters a normal mode.

Step 306: The standby agent controller forwards the received request to the system operating in the normal mode.

Step 308: The system deals with the received request. For example, the system enables real-time communications in response to the received request.

As a person skilled in the art should readily understand details of each step after reading above paragraphs, further description is omitted here for brevity. As a connection handling method, including steps 302-306, is performed during a power-on procedure of one system (e.g., the local system 105/106), a request generated from another system (e.g., the remote system 102) via Internet 101 is forwarded to the specific system.

Figure 4:
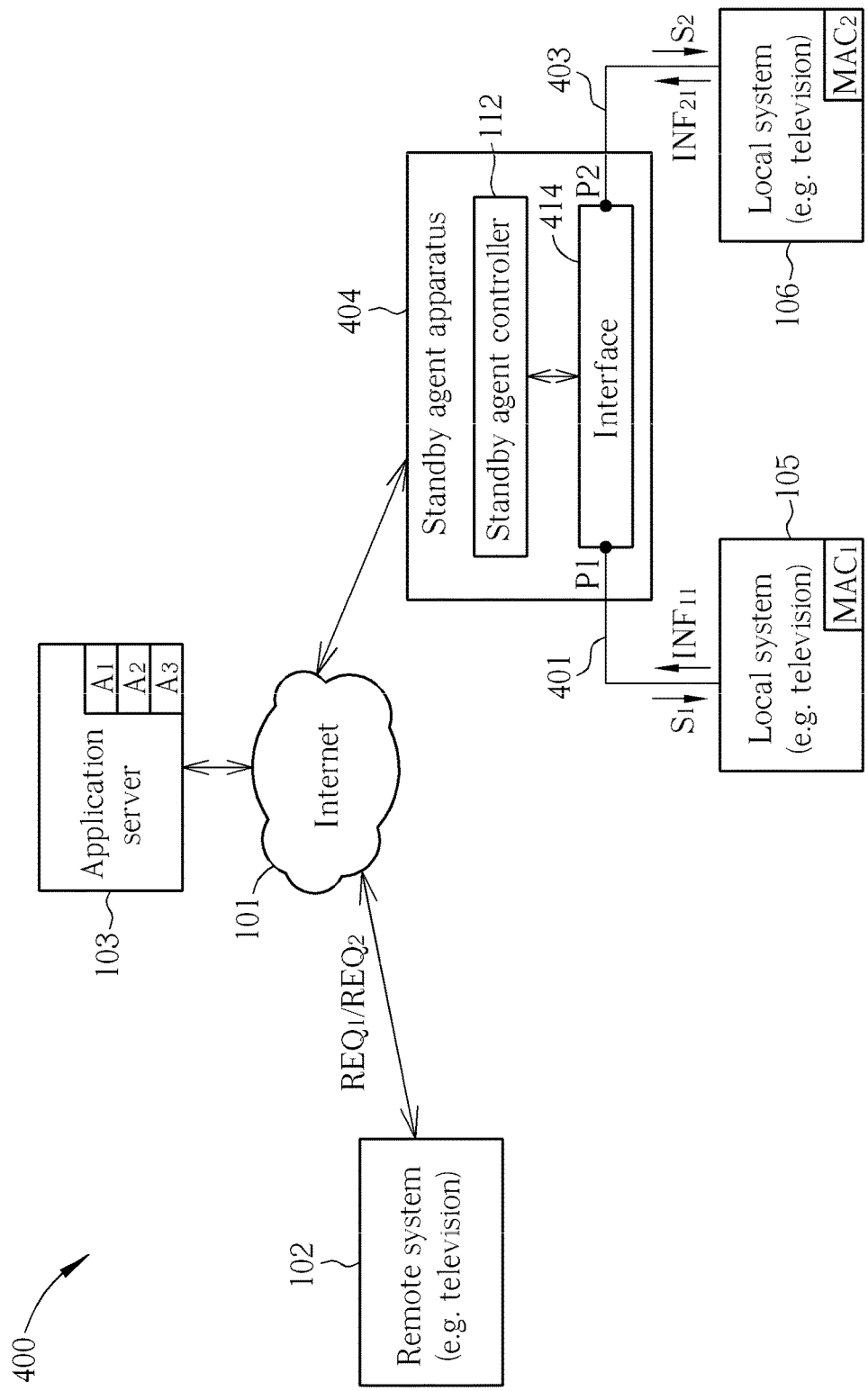
FIG. 4 is a diagram illustrating a second system architecture according to an exemplary embodiment of the present invention.

In the exemplary embodiment shown in FIG. 1, the local systems 105 and 106 are disposed in the LAN 107, thus allowing the standby agent apparatus 104 to wake up the local systems 105 and 106 by using corresponding MAC addresses MAC$_1$ and MAC$_2$. However, this is for illustrative purposes only. In practice, any means capable of waking up the local system 105/106 may be employed by the proposed standby agent apparatus. Please refer to FIG. 4, which is a diagram illustrating a second system architecture according to an exemplary embodiment of the present invention. The second system architecture 400 is similar to the first system architecture 100, and the major difference is that the interface 414 of the standby agent apparatus 404 has a plurality of connection ports P1 and P2, and the local systems 105 and 106 are connected to the connection ports P1 and P2 through connection cables 401 and 403, respectively. For example, the connection port P1/P2 may be a high definition multimedia interface (HDMI) port or an RS232 port. As the standby agent controller 112 can easily know that the connection P1 is connected to the local system 105 and the connection port P2 is connected to the local system 106, the local systems 105 and 106 do not need to transmit the aforementioned identification information INF$_{12}$ and INF$_{22}$ (e.g., MAC addresses) to the standby agent apparatus 404. Therefore, when the standby agent controller 112 receives the request REQ$_1$/REQ$_2$ under a condition where the local system 105/106 is operating in the standby mode, the standby agent controller 112 is operative to wake up the local system 105/106 by outputting the wake-up signal S$_1$/S$_2$ through the corresponding connection port P$_1$/P$_2$. The same objective of waking up the local system 105/106 in response to the reception of the request REQ$_1$/REQ$_2$ is achieved.

Figure 5:
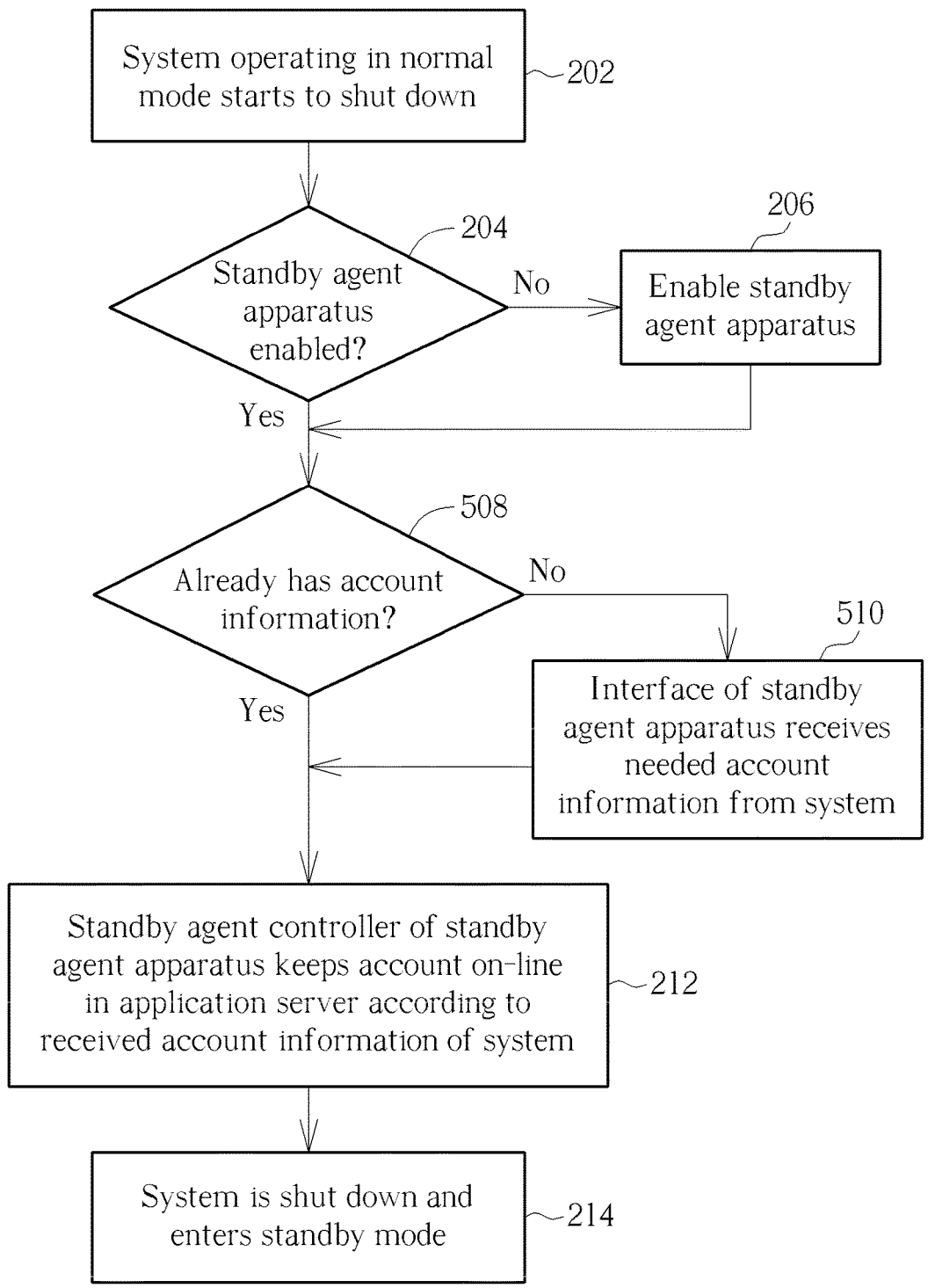
FIG. 5 is a flowchart illustrating another system power-down procedure according to an exemplary embodiment of the present invention.

FIG. 5 is a flowchart illustrating another system power-down procedure according to an exemplary embodiment of the present invention. It should be noted that if the result is substantially the same, the steps are not required to be executed in the exact order shown in FIG. 5. The system power-down procedure shown in FIG. 5 is similar to the system power-down procedure shown in FIG. 2, and the major difference is that the step 508 is executed to check if the standby agent apparatus already has account information of a system, and step 510 is executed to receive the needed account information from a system. To put it simply, no identification information (e.g., a MAC address) of a system is checked in step 508 and received in step 510.

Figure 6:
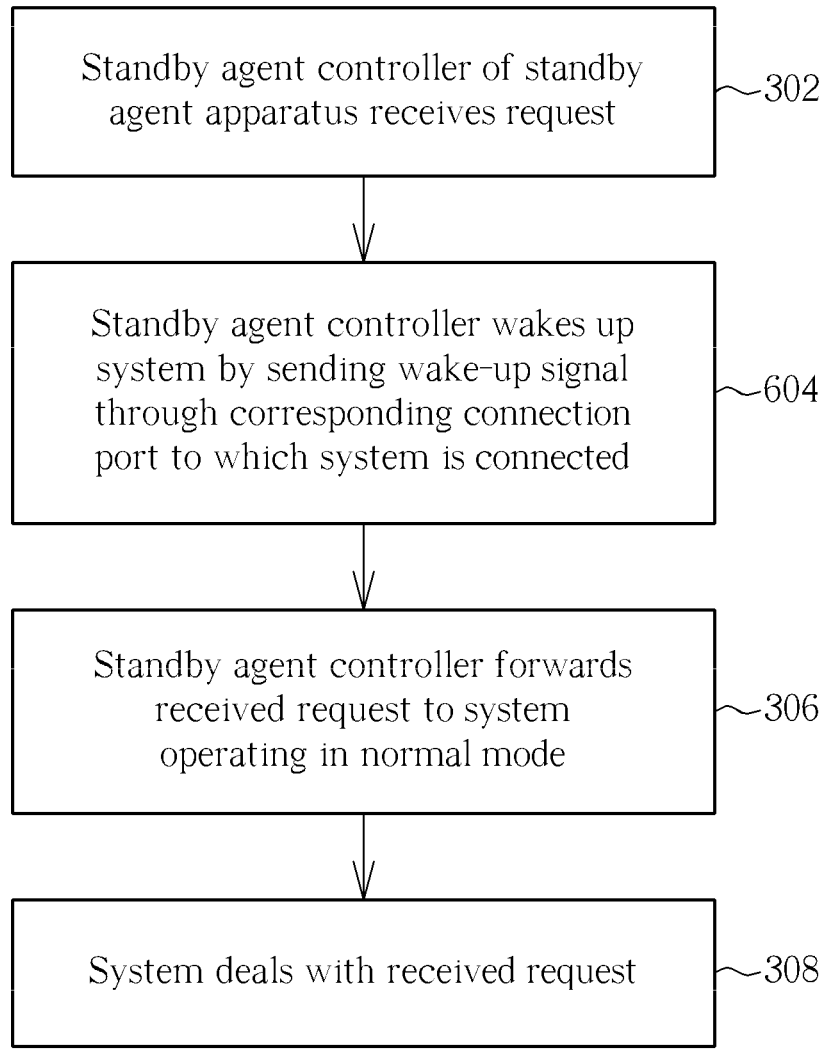
FIG. 6 is a flowchart illustrating another system power-on procedure according to an exemplary embodiment of the present invention.

FIG. 6 is a flowchart illustrating another system power-on procedure according to an exemplary embodiment of the present invention. It should be noted that if the result is substantially the same, the steps are not required to be executed in the exact order shown in FIG. 6. The system power-on procedure shown in FIG. 6 is similar to the system power-on procedure shown in FIG. 3, and the major difference is that the step 604 is executed to wake up a system by sending a wake-up signal through a corresponding connection port to which a system is connected. To put it simply, no identification information (e.g., a MAC address) of a system is involved in waking up the system.

In the exemplary system architectures 100 and 400 mentioned above, the standby agent apparatus 104/404 supports multiple systems, each using the same real-time communication application. However, this is for illustrative purposes. In an alternative design, the standby agent apparatus may support one or more systems, each using multiple real-time communication applications. Further details are described as below.

Figure 7:
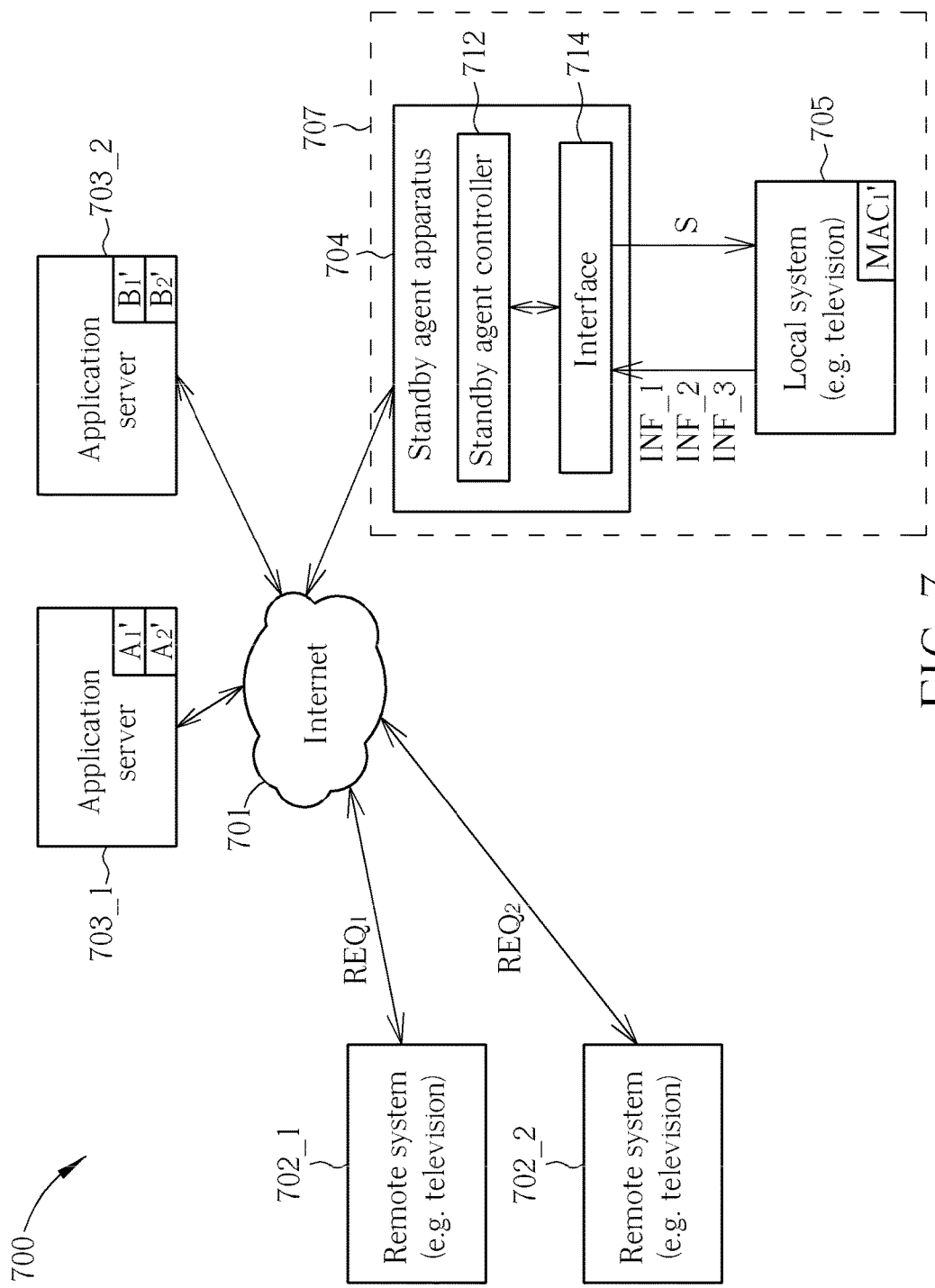
FIG. 7 is a diagram illustrating a third system architecture according to an exemplary embodiment of the present invention.

FIG. 7 is a diagram illustrating a third system architecture according to an exemplary embodiment of the present invention. By way of example, but not limitation, the third system architecture 700 is used for real-time communications. There are remote systems (e.g., televisions) 702_1 and 702_2 coupled to application servers 703_1, 703_2 via the Internet 701, respectively. In this exemplary embodiment, the application servers 703_1 and 703_2 are arranged for managing different real-time communication services. The standby agent apparatus 704 is disposed outside of a local system (e.g., a television) 705, and coupled to the application servers 703_1 and 703_2 via Internet 701. The standby agent apparatus 704 may be disposed in a network apparatus whose power is always on. For example, the network apparatus may be a hub, a switch or a DSL modem, and the standby agent apparatus 704 and the local system 705 are therefore disposed in an LAN 707, where the local system 705 has a media access control (MAC) address $MAC_1'$.

Regarding the standby agent apparatus 704, it includes a standby agent controller 712 and an interface 714. The interface 714 may be a network interface coupled to the local system 705 which uses real-time communication services managed by the application servers 703_1 and 703_2. When the local system 705 is about to enter a standby mode due to a power-down procedure, the local system 705 transmits account information INF_1, INF_2 and identification information INF_3 (e.g., MAC address $MAC_1'$) of the local system 705 to the standby agent apparatus 704, where the account information INF_1 may include an account name and a password corresponding to the real-time communication service managed by the application server 703_1, and the account information INF_2 may include an account name and a password corresponding to the real-time communication service managed by the application server 703_2. In other words, the interface 714 is used for receiving the account information INF_1, INF_2 and the identification information INF_3 of the local system 705.

The standby agent controller 712 is coupled to the interface 714, and is capable of accessing the received account information INF_1, INF_2 and identification information INF_3 through the interface 714. When the local system 705 is operating in the standby mode (i.e., the local system 705 is powered off), the standby agent controller 712 is operative to keep an account $A_1'$ of the local system 705 on-line in the application server 703_1 according to the received account information INF_1, and keep an account $B_1'$ of the local system 705 on-line in the application server 703_2 according to the received account information INF_2.

The accounts $A_1'$ and $B_1'$ of the local system 705 would remain on-line in respective application servers 703_1 and 703_2 after the local system 705 is powered off. The user of the remote system 702_1, which has on-line account $A_1'$ in the application server 703_1, would find the account $A_1'$ of the shut-down system is on-line, and is allowed to make contact with the user of the shut-down system through the real-time communication software executed on the remote system 702_1. Similarly, the user of the remote system 702_2, which has on-line account $B_2'$ in the application server 703_2, would find the account $B_1'$ of the shut-down system is on-line, and is allowed to make contact with the user of the shut-down system through the real-time communication software executed on the remote system 702_2. Hence, after the local system 705 is powered off, one of the remote systems 702_1 and 702_2 may send a request REQ_1/REQ_2 to the local system 705 to ask for real-time communications.

When the standby agent controller 712 receives the request REQ_1/REQ_2 under a condition where the local system 705 is operating in the standby mode, the standby agent controller 112 is operative to wake up the local system 705. Specifically, as the local system 705 is disposed in the LAN 707 and the corresponding identification information (e.g., the MAC address $MAC_1'$) is sent to the standby agent apparatus 704 beforehand, the standby agent controller 712 may send a wake-up signal (wake-up packet) S to the MAC address $MAC_1'$ for waking up the local system 705. After the local system 705 leaves the standby mode and enters the normal mode, the standby agent controller 712 forwards the received request REQ_1/REQ_2 to the local system 705, and then the local system 705 deals with the request REQ_1/REQ_2 for enabling real-time communications between users of the remote system 702_1/702_2 and the local system 705. As a person skilled in the art can readily understand details of the third system architecture 700 after reading above paragraphs directed to system architecture and related method shown in FIGS. 1-3, further description is omitted here for brevity.

Figure 8:
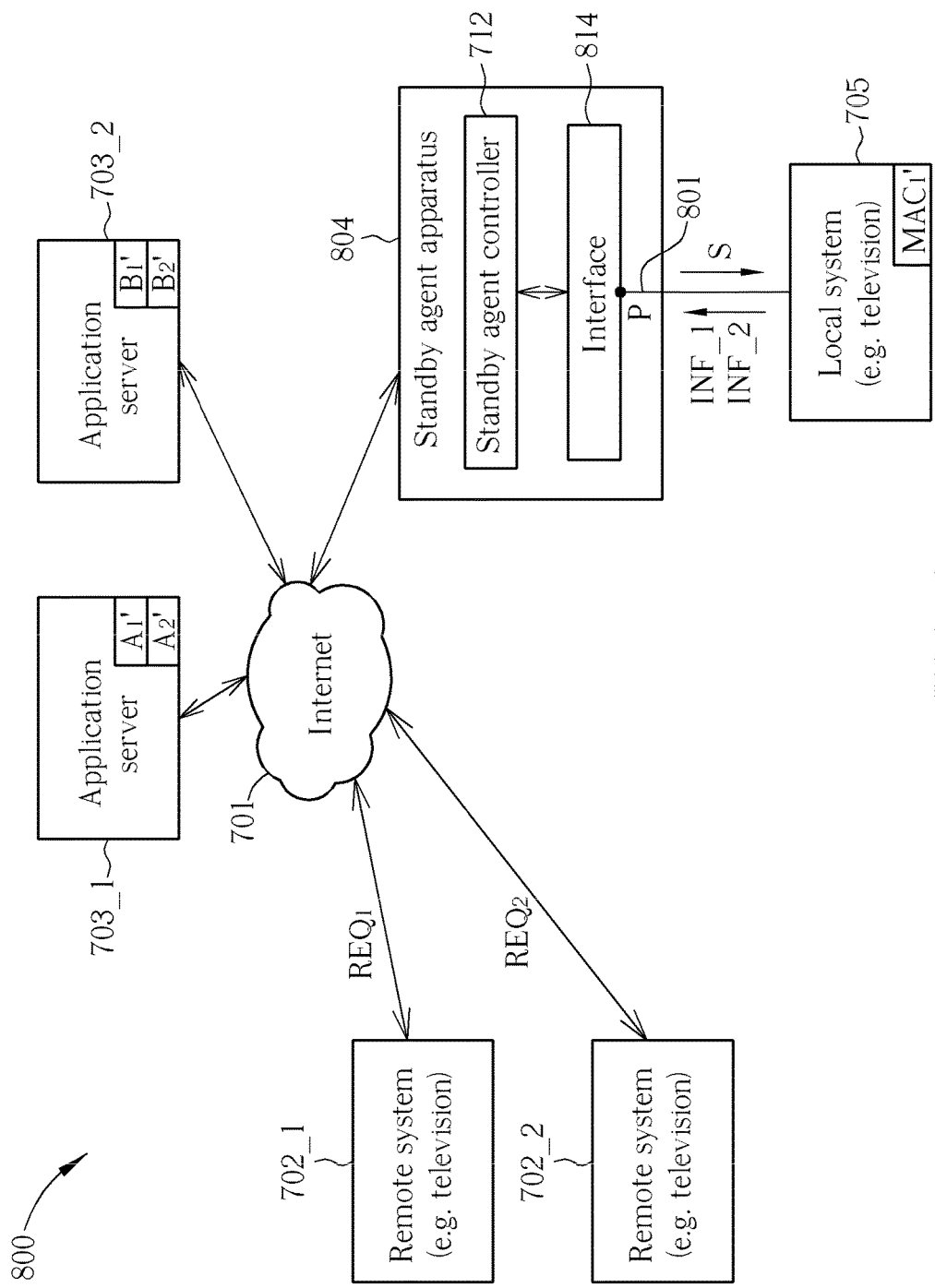
FIG. 8 is a diagram illustrating a fourth system architecture according to an exemplary embodiment of the present invention.

In the exemplary embodiment shown in FIG. 7, the local system 705 is disposed in the LAN 707, thus allowing the standby agent apparatus 704 to wake up the local system 705 by using the corresponding MAC address $MAC_1'$. However, this is for illustrative purposes only. In practice, any means capable of waking up the local system 705 may be employed by the standby agent apparatus 704. Please refer to FIG. 8, which is a diagram illustrating a fourth system architecture according to an exemplary embodiment of the present invention. The fourth system architecture 800 is similar to the third system architecture 700, and the major difference is that the interface 814 of the standby agent apparatus 804 has a connection port P1 such as an HDMI port or an RS232 port, and the local system 705 is connected to the connection port P1 through a connection cable 801. As the standby agent controller 712 can easily know that the connection P1 is connected to the local system 705, the local system 705 does not need to transmit the aforementioned identification information INF_3 (e.g., MAC addresses $MAC_1'$) to the standby agent apparatus 804. Therefore, when the standby agent controller 712 receives the request REQ_1/REQ_2 under a condition where the local system 705 is operating in the standby mode, the standby agent controller 712 is operative to wake up the local system 705 by outputting the wake-up signal S through the corresponding connection port $P_1$. The same objective of waking up the local system 705 in response to the reception of the request REQ_1/REQ_2 is achieved. As a person skilled in the art can readily understand details of the fourth system architecture 800 after reading above paragraphs directed to system architecture and related method shown in FIGS. 4-6, further description is omitted here for brevity.

Figure 9:
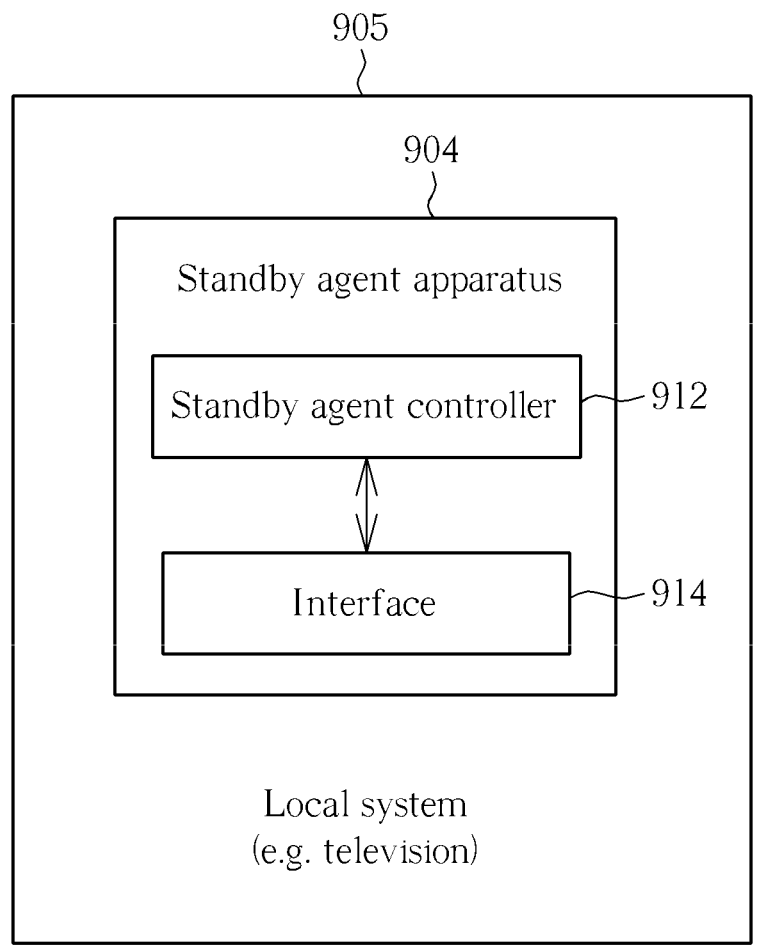
FIG. 9 is a diagram illustrating an alternative design of a standby agent apparatus according to an exemplary embodiment of the present invention.

Regarding above exemplary system architectures, the standby agent apparatus is disposed outside of one or more supported systems. Alternatively, one standby agent apparatus may be disposed in each supported system. In other words, the standby agent apparatus may be a dedicated apparatus of one supported system. FIG. 9 is a diagram illustrating an alternative design of a standby agent apparatus according to an exemplary embodiment of the present invention. As shown in FIG. 9, the standby agent apparatus 904 is disposed in the local system (e.g., a television) 905, and has a standby agent controller 912 and an interface 914, where the interface 914 may be an internal connector used to receive the account information of one or more applications (e.g., real-time communication applications) and output a wake-up signal. It should be noted that the standby agent apparatus 905 remains active when the local system 905 is powered off. Therefore, when the local system 905 is operating in a standby mode, the standby agent controller 904 keeps an account of the local system 905 on-line in an application server according to the account information of the local system 905 that is received by the interface 914. Besides, when the standby agent controller 912 receives a request under a condition where the local system 905 is operating in the standby mode, the standby agent controller 912 wakes up the local system 905 to enter the normal mode for dealing with the received request.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A standby agent apparatus, comprising:
an interface circuit that is configured to receive at least first account information associated with an account of a first electronic device from the first electronic device; and
a standby agent control circuit that is coupled to the interface and configured to access the received first account information, wherein when the first electronic device is operating in a standby mode where the first electronic device is communicatively disconnected from a first application server after the first electronic device logs in the first application server with the account of the first electronic device, the standby agent control circuit is further configured to keep the account of the first electronic device on-line in the first application server according to the received first account information.

2. The standby agent apparatus of claim 1, wherein the standby agent control circuit does not keep the account of the first electronic device on-line in the first application server when the first electronic device is operating in a normal mode where the first electronic device is communicatively connected to the first application server.

3. The standby agent apparatus of claim 1, wherein when the standby agent control circuit receives a request under a condition where the first electronic device is operating in the standby mode, the standby agent control circuit is further configured to:
wake up the first electronic device to enter a normal mode where the first electronic device is communicatively connected to the first application server; and
forward the request to the first electronic device.

4. The standby agent apparatus of claim 3, wherein
the interface is further configured to receive identification information of the first electronic device; and
the standby agent control circuit is configured to wake up the first electronic device according to the identification information of the first electronic device.

5. The standby agent apparatus of claim 4, wherein the identification information of the first electronic device includes a media access control (MAC) address of the first electronic device.

6. The standby agent apparatus of claim 1, wherein
the interface is further configured to receive second account information associated with an account of a second electronic device; and
when the second electronic device is operating in a standby mode where the second electronic device is communicatively disconnected from the first application server after the second electronic device logs in the first application server with the account of the second electronic device, the standby agent control circuit is further configured to keep the account of the second electronic device on-line in the first application server according to the received second account information.

7. The standby agent apparatus of claim 1, wherein
the interface is further configured to receive second account information of the first electronic device; and
when the first electronic device is operating in the standby mode, the standby agent control circuit is further configured to keep another account of the first electronic device on-line in a second application server according to the received second account information.

8. The standby agent apparatus of claim 1, wherein the standby agent apparatus is disposed outside of the first electronic device.

9. The standby agent apparatus of claim 1, wherein the standby agent apparatus is disposed in the first electronic device.

10. The standby agent apparatus of claim 1, wherein the standby agent control circuit is configured to keep the account of the first electronic device on-line in the first application server which manages a real-time communication service.

11. A connection handling method, comprising:
receiving first account information associated with an account of a first electronic device from the first electronic device; and
when the first electronic device is operating in a standby mode where the first electronic device is communicatively disconnected from a first application server after the first electronic device logs in the first application server with the account of the first electronic device, keeping, by a standby agent control circuit, the account of the first electronic device on-line in the first application server according to the received first account information.

12. The connection handling method of claim 11, wherein keeping the account of the first electronic device on-line in the first application server is not executed when the first electronic device is operating in a normal mode where the first electronic device is communicatively connected to the first application server.

13. The connection handling method of claim 11, further comprising:
when receiving a request under a condition where the first electronic device is operating in the standby mode,
waking up the first electronic device to enter a normal mode where the first electronic device is communicatively connected to the first application server, and
forwarding the request to the first electronic device.

14. The connection handling method of claim 13, further comprising:
receiving identification information of the first electronic device;
wherein waking up the first electronic device comprises:
waking up the first electronic device according to the identification information of the first electronic device.

15. The connection handling method of claim 14, wherein the identification information of the first electronic device includes a media access control (MAC) address of the first electronic device.

16. The connection handling method of claim 11, further comprising:
receiving second account information associated with an account of a second electronic device; and
when the second electronic device is operating in a standby mode where the second electronic device is communicatively disconnected from the first application server after the second electronic device logs in the first application server with the account of the second electronic device, keeping the account of the second electronic device on-line in the first application server according to the received second account information.

17. The connection handling method of claim 11, further comprising:
receiving second account information of the first electronic device; and when the first electronic device is operating in the standby mode, keeping another account of the first electronic device on-line in a second application server according to the received second account information.

18. The connection handling method of claim 11, wherein keeping the account of the first electronic device on-line in the first application server is executed by the standby agent control circuit of a standby agent apparatus that is disposed outside of the first electronic device.

19. The connection handling method of claim 11, wherein keeping the account of the first electronic device on-line in the first application server is executed by the standby agent control circuit of a standby agent apparatus that is disposed in the first electronic device.

20. The connection handling method of claim 11, wherein the first application server is arranged for managing a real-time communication service.

\* \* \* \* \*